Nov. 25, 1969 B. F. GRIB 3,480,809

TUNING FORK RESONATOR WITH REED-MODE DAMPING AND REED SIGNAL CANCELLATION

Filed July 9, 1968 2 Sheets-Sheet 1

INVENTOR

BORIS F. GRIB

BY Darby & Darby

ATTORNEYS

Nov. 25, 1969 B. F. GRIB 3,480,809

TUNING FORK RESONATOR WITH REED-MODE DAMPING AND REED SIGNAL CANCELLATION

Filed July 9, 1968 2 Sheets-Sheet 2

United States Patent Office 3,480,809

Patented Nov. 25, 1969

3,480,809

TUNING FORK RESONATOR WITH REED-MODE DAMPING AND REED SIGNAL CANCELLATION

Boris F. Grib, Huntington, N.Y., assignor to Philamon Incorporated, Westbury, N.Y., a corporation of New York Filed July 9, 1968, Ser. No. 743,445

Int. Cl. H02k 35/02

U.S. Cl. 310—25 8 Claims

ABSTRACT OF THE DISCLOSURE

There is disclosed a tuning fork resonator with electrical drive and pick up coils and a tuning fork having a pair of tines, a common tine junction section, a heel portion for securing the fork in place and a pliant section between the common tine junction portion and the heel portion of the fork. The common tine junction portion has an extension rigidly coupled therewith. The extension of the common tine junction portion oscillates in phase with any reed mode vibration of the fork and is provided with physical damping to damp the reed mode vibration and also with one or more pick-up coils generating a signal which will tend to cancel the reed mode signal generated in the principal tuning fork pick-up coil.

Tuning fork resonators are commonly used both as a highly selective filter for electrical signals or in conjunction with a feedback amplifier to provide a very stable oscillator. In any application of a tuning fork resonator it is desirable to exploit the advantages of the fork-mode vibration of the tuning fork and to suppress all effects stemming from the reed-mode vibration of the tuning fork. This is a well established principle in my prior patent applications, for example, application Ser. No. 599,522 filed Dec. 6, 1966, now Patent #3,425,310, entitled Balanced and Coupled Tuning Fork Mounting Structure for Suppressing Reed Vibrator, the names of Boris F. Grib and Robert R. Shreve.

As explained in my prior applications and patents in more detail the tuning fork resonator fork mode vibration consists of the tines of the fork simultaneously moving toward each other and then away from each other in "Perfect Mirror Image" synchronism.

For the purpose of this discussion the tuning fork is assumed to have a common tine junction structure which is effectively rigid as opposed to the tines which must be at least in part compliant.

The tines can be envisioned as a pair of side by side cantilever beams joined together at the end opposite their free end. During fork mode vibration the "tine-cantilevers" provide for each other a common opposing fulcrum and a common opposing moment arm against which the tines can be opposingly rotated around their respective tine axis of rotation. If the tines are equal as to stiffness, mass, and deflection, the opposing forces imparted to the common tine junction are equal and opposite and thus do not tend to produce any lateral motion of the common tine junction. It will be seen that if the tine portion and the common tine junction portion of a tuning fork is not mounted to anything but is effectively floating freely, it will only be possible for the tines to vibrate in the fork mode as they would only have each other as a means to create the necessary restoring forces required for sustained harmonic vibratory motion. Since the action and reaction in a system must be equal and opposite the motions of the tines in the hypothetical situation described must be equal and opposite and thus represent perfect fork-mode vibration.

Practical tuning forks may not have their common tine junction completely unrestrained as in the foregoing hypothetical case. Nevertheless, the above described mutual reactions of the vibrating tines is responsible for the predominance of fork-mode vibration in tuning fork structures. In fact, if one were to totally constrain the common tine junction portion of a tuning fork, there would be no effective coupling between the tines of the tuning fork and each would vibrate essentially as an independent reed. In such a case the inevitable slight difference in the frequency of the vibration of the independent tines would cause their phase relationship to constantly change and no sustained fork-mode vibration could exist.

In order to avoid the deleterious effects of undue constraint on the common tine junction area of the tuning fork it is known to be desirable to introduce a pliant portion between the common tine junction of the tuning fork and the heel of the tuning fork as illustrated in my U.S. Patent No. 2,806,400 and others.

The pliant section serves several functions. For example, it reduces the amount of lateral vibration that would otherwise be transmitted to the heel and mounting base due to unbalance of the tine, which unbalance is not entirely avoidable. When the tines are not in balance the opposing forces at the common tine junction are not exactly equal resulting in a net lateral force. The compliance of the pliant section is such as to provide lateral motion compliance of the tine junction area relative to the heel and mounting base for the tuning fork; this minimizes tuning fork energy losses in the base mount and contributes toward maximal tuning fork resonator Q.

The pliant section also acts as a shock and vibration isolator in that it mechanically decouples the common tine junction from the heel and mounting base. In other words, if the mounting base and tuning fork heel are exposed to a given lateral shock or vibration, something less than this shock or vibration will be imparted to the centers of mass of the tines.

Furthermore, to the extent that the tines are in balance any shock or vibration imparted to their centers of mass will not be in such phase as to create differential "fork mode" forces on the tines, but will tend to cause the tines to move in the same direction thus not interfering with the normal "fork mode" vibration of the tines. Thus the pliant section permits the fork tines to be displaced by shock or vibration by deflecting together in the same lateral direction while the "fork-mode" vibrations continue without significant interference.

It is important to again emphasize a very basic function of the pliant section in assuring a heavily predominant or fork-mode vibration as compared to "twin reed" vibration. The pliant section assures that there is not excessive rigidity in the mounting of the common tine junction hence, even though the tines are not perfectly balanced and are not uniformly excited, they are nevertheless coupled to vibrate in unison in the fork-mode and not independently as individual reeds.

The use of a pliant section or its equivalent between the common tine junction and the fork mounting heel is essential to provide the above described desirable performance functions. The less the stiffness of the pliant section (as compared to individual tine stiffness) the greater degree of improvement in the desirable performance function. This assumes that the masses remain the same.

The pliant section, however, introduces an additional lateral restoring force and mass combination thus creating an undesired lateral (reed) resonant frequency of vibration. The reed resonant frequency herein referred to will be determined by the combined mass moments of the tines and common junction and by the stiffness of the pliant section. Obviously the resonant frequency of each individual fork tine (which corresponds to the fork-mode resonant frequency) is a function of the stiffness of each tine and its mass moment of inertia.

Experimentation and practical experience has shown that the three desirable functions of the pliant section are performed fairly satisfactorily when the reed resonant frequency is set at a value slightly below 100% of the fork-mode resonant frequency. The performance improves markedly as the percentage is reduced and continues to improve even as the reed frequency as a percentage of fork-mode frequency is reduced below 75%. The lower limit for this percentage is determined by the maximum lateral reed deflection tolerable under the maximum anticipated lateral shock or vibration.

The deflection of a reed under lateral acceleration of one g. varies approximately inversely as the square of its resonant frequency. As a convenient rule of thumb the deflection in inches of a reed measured at its radius of gyration (normally about midway between the vibrating tip of the reed and its axis of vibration at the compliant section) is approximately equal to ten divided by the square of the frequency. It may be noted that the deflection at the tip of the reed may be and usually is more than the deflection at its radius of gyration. By way of example, if resistance to accelerations of 100 g. is called for and a deflection of .025 inch at the radius of gyration is acceptable then a 400 cycle per second tuning fork may have a reed mode as low as 50% of fork frequency or a 2000 cycle per second tuning fork may have a reed mode as low as 10% of fork frequency.

The present invention permits maximum utilization of the desirable characteristics of the pliant section at the same time minimizing its detrimental aspects both by damping undesired reed frequency vibrations and by cancelling electrical signals correlated to the reed vibration.

In the present invention the common tine junction of the tuning fork or preferably a lever arm extension thereof is utilized to achieve physical coupling which dampens the reed vibration and also to achieve electromagnetic coupling for cancelling reed vibration.

In addition to providing the features and advantages described above, it is an object of the present invention to provide a tuning fork resonator having a pliant section between the common tine junction and the heel of the fork but which includes a physical coupling to the common tine junction for damping vibrations at the reed frequency.

It is another object of the present invention to provide a tuning fork resonator having a pliant section between the common tine junction and the heel portion of the tuning fork in which the common tine junction or a rigid extension thereof provides a relatively long lever arm to permit electromagnetic coupling to the common tine junction such that electrical signal cancellation of reed-motion-induced signals can be achieved.

Other objects and advantages of the present invention will be apparent from a consideration of the following description in conjunction with the appended drawings in which.

FIGURES 5 through 10 are generally schematic illustrations of alternative forms of pliant sections for tuning fork resonators to which the present invention is applicable; and FIGURES 11 through 15 are generally schematic illustrations of alternative forms of common tine junction extensions suitable for the present invention and combinable with the alternatives illustrated in FIGURES 5 through 11 or substitutable for those shown in FIGURES 1 through 4.

Figure 1:
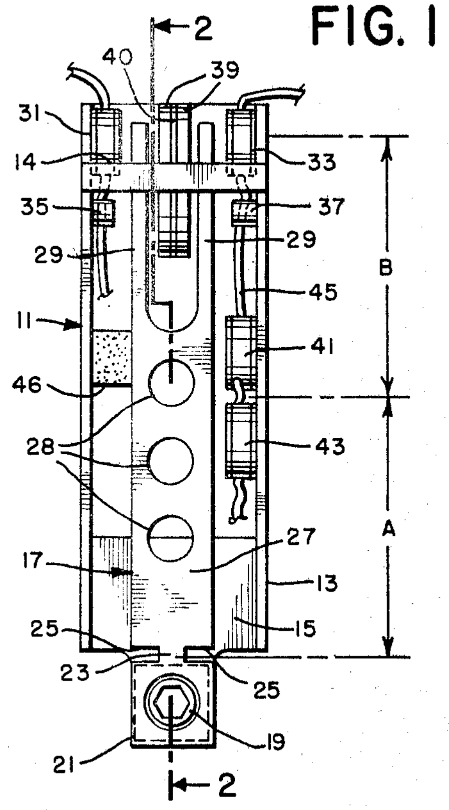
FIGURE 1 is a plan view of a tuning fork resonator in accordance with the invention.
Figure 2:
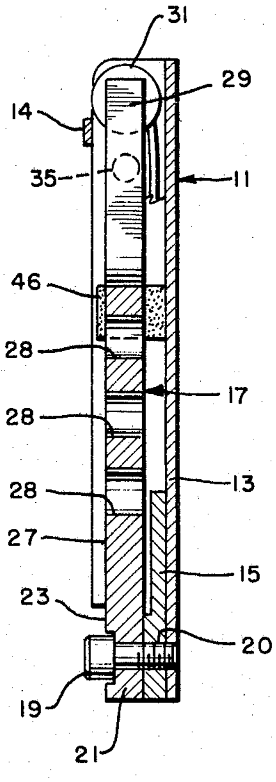
FIGURE 2 is a sectional view of the resonator of FIGURE 1 taken along the line 2—2 in FIGURE 1.

Referring to FIGURES 1 and 2, an electrically driven tuning fork resonator 11 is shown having a base 13 in the form of a channel formed of metal which preferably has a high magnetic permeability. The open top of the channel shaped base 13 may be reenforced with bars as shown at 14 to provide greater immunity from shock and vibration. The reenforcing bar 14 is preferably formed of a material having a low magnetic permeability.

A tuning fork 17 is mounted within channel shaped base 13 on a platform 15 so that tuning fork 17 is positioned at an appropriate distance above the floor of base 13.

Tuning fork 17 may be mounted to platform 15 and base 13 by any suitable conventional fastening illustratively represented in FIGURES 1 and 2 by bolt 19 secured in tapped hole 20 in platform 15 and base 13.

Tuning fork 17 includes a heel support portion 21, a pliant portion 23 formed by slots 25, an elongated common tine junction portion 27 and fork tines 29. The common tine junction portion 27, for reasons later to be explained, is provided with holes 28 appropriately dimensioned and placed to lighten the common tine junction portion 27 without substantially diminishing its rigidity.

The electrically driven tuning fork resonator of FIGURE 1 is provided with a drive coil 31 and a pickup coil 33 positioned on opposite sides of the tuning fork 17. Coils 31 and 33 are wound on permanent magnets to provide a magnetic bias as is customary in the design of such tuning fork resonators.

The magnetic field associated with drive coil 31 is enhanced by a magnet 35 so that the magnetic circuit for the drive coil 31 includes its own magnetic core, a portion of the side wall of base 13, magnet 35 and a portion of the left one of tines 29. An additional drive coil could be wound about magnet 35 and connected in common with coil 31 but this is unnecessary and is not illustrated in the embodiment of FIGURE 1.

Pickup coil 33 is also wound on a permanent magnet core and a similar magnet 37 cooperates therewith to provide an appropriate magnetic circuit for pickup coil 33 in accordance with conventional practice.

Direct electromagnetic coupling between drive coil 31 and pickup coil 33 is highly deleterious and is very effectively suppressed in the construction of FIGURE 1 by magnetic barriers 39 which are bent up from and integral with the floor of base 13 under coils 31 and 33, respectively. The barriers 39 are magnetically isolated from one another by a thin separator 40 formed of a material of very low magnetic permeability compared to that of barriers 39 and base 13 in general. It may be appreciated in this connection that the use of low permeability material in bar 14 is also desirable to prevent electromagnetic coupling directly between drive coil 31 and pickup coil 33.

A pair of reed cancellation coils 41 and 43 are connected in series with pickup coil 33 by lead 45. It will be observed that any reed vibration of tuning fork 17 resulting from bending about compliant portion 23 will cause a change in the air gap for magnets 33, 41 and 43 which is in the same sense at any particular instant. The change in the air gap for magnets 41 and 43 will each be approximately half the change in the air gap for magnet 33.

The magnetic polarity and the winding direction for magnets 41 and 43 is such that the electromotive forces generated by a reed vibration about compliant portion 23 is opposite to the electromotive force generated in coil 33 at any given instant. Furthermore, since the coils 41 and 43 may be arranged with a total number of turns approximately two times that of coil 33 the sum of the electromotive forces of coils 41 and 43 can be made very nearly equal to the electromotive force of coil 33 notwithstanding the fact that the displacement of the fork at coils 41 and 43 is only approximately half that of its displacement at coil 33 by virtue of bending about pliant portion 23.

From the foregoing it will be seen that coils 41 and 43 cause virtual cancellation of electrical signals generated in coil 33 due to displacement or vibration of fork structure 17 bending about pliant portion 23. On the other hand, only pickup coil 33 is affected by fork mode vibration of tines 29 and hence coils 41 and 43 have virtually no effect on the pickup of fork vibrations.

Notwithstanding the fact that electrical pickup of reed vibrations through bending of pliant portion 23 can be almost completely cancelled by coils 41 and 43, such vibrations are essentially undesirable and should not be permitted to be built up or sustained. For this purpose a dampening element 46 is secured between base 13 and the outer extremity of common tine junction portion 27 to dissipate reed mode vibrations of tuning fork 17. Damping element 46 may be formed of any suitable high internal friction material such as a silicone rubber compound and may be cemented between the wall of base 13 and the tuning fork common tine junction portion 27. The degree of damping of the reed mode vibration should allow the reed mode Q to be approximately between 5 and 50. In other words, there is no danger of excess damping so long as the fraction relative to critical damping is less than .10 (giving reed mode Q of greater than 5) as the isolation imparting benefits of the pliant section in such case will be greater than 90% effective as compared with reed mode Q approaching infinity.

The overall operation of the apparatus of FIGURES 1 and 2 will now be described. The tuning fork 17 is similar to prior tuning forks in that it is provided with a pliant section 23 serving a number of useful functions previously described. The tuning fork 17 differs however in that the common tine junction portion 27 includes a rigid elongated structure. It is thereby possible to locate coils 41 and 43 with respect to the common tine junction portion 27 to generate an electrical signal which corresponds to the reed frequency vibration of the tuning fork 17 and is relatively unaffected by fork mode vibrations of the tuning fork 17.

Thus by combining the signal of coils 41 and 43 with the signal from a generally conventional pickup coil 33, it is possible to obtain a signal in which the tuning fork reed mode vibration components are effectively cancelled due to the opposite sense of such signals in coils 41 and 43 as compared with coil 33. This achieves the desired result of obtaining an electrical signal which depends solely upon the fork mode vibrations of tuning fork 17 and is relatively unaffected by any reed mode vibrations.

Reed mode vibrations are on occasion electrically introduced by input signals in drive coil 31 corresponding to the reed mode vibration frequency. As to such source of reed mode vibrations, it would be effective to connect reed cancellation coils similar to coils 41 and 43 as drive coils in opposition to drive coil 31. In this fashion forces tending to produce reed mode vibrations due to the input signal to the tuning fork resonator would be effectively cancelled. Such an arrangement without reed cancellation coils in the output circuit does not, however, ameliorate the problem of reed mode vibrations which are physically induced by vibration or shock and thus reed cancellation in the drive circuit alone would not produce optimum results in most circumstances. Cancellation could be provided both in the input or drive circuit and in the output or pickup circuit at the expense of possibly increasing the problem of direct electromagnetic coupling between input and output.

It should be noted that, once having a transducer coupled to the tuning fork only for the reed mode of vibration, it is possible to suppress reed vibrations in numerous ways. As a further example, one may use the reed coupled coil to generate a signal corresponding to reed vibration which may then be amplified and supplied to the fork drive coil (or a special drive coil) with a phase relationship that suppresses the reed vibration.

It should also be noted that illustratively the reed cancellation coils 41 and 43 are themselves connected in series and are in series with the pickup coil 33. Obviously, a parallel circuit connection or other circuit connections may be substituted in accordance with the knowledge of the art to achieve the desired result that signals induced in pickup coil 33 alone shall appear in the output while signals picked up simultaneously at pickup coil 33 and reed cancellation coils 41 and 43 shall not appear at the output.

It has previously been explained in general that two reed cancellation coils 41 and 43 are provided to compensate for the fact that the distance A in FIGURE 1 is approximately equal to the distance B. The distance $A+B$ is therefore approximately twice the distance A and a coil located at the position of coil 33 is approximately twice as effective in producing signals responsive to reed mode vibration as is a coil located at the median position between coils 41 and 43. In order to balance the cancellation signal with the pickup signal it is convenient to provide two cancellation coils. Obviously, the cancellation signal could be enhanced by increasing the turns of wire or the magnetic flux of the core to achieve the balance required for cancellation and thus eliminate the need for more than one cancellation coil.

On the other hand, the efficiency of the cancellation coils in generating a signal responsive to reed vibration can be enhanced so that the relative length of dimension A in FIGURE 1 can be reduced as compared with the distance $A+B$ and the overall tuning fork resonator frequency dimensions thereby reduced.

It has previously been explained that the structure of FIGURE 1 is arranged to minimize the direct electromechanical coupling between drive coil 31 and pickup coil 33. It should further be noted that the windings of coils 41 and 43 are in opposite sense which fact taken together with their remoteness from drive coil 31 renders the direct electromagnetic coupling from coil 31 to coils 41 and 43 very low.

It is possible and desirable to still further reduce the electromagnetic coupling between the input and output circuit of FIGURE 1 by causing the coupling induced in coils 41 and 43 as a combination to be equal and opposite to that induced in coil 33. This is very simply accomplished since the coupling induced in coils 41 and 43 is opposite and one can maintain the same total number of turns in coils 41 and 43 while at the same time increasing or decreasing the net direct electromagnetic coupling to coils 41 and 43 so that it equals and compensates for the coupling the coil 33.

It has been seen that the structure of FIGURE 1 reduces the electromagnetic coupling to a very low almost negligible value. The signals which are permitted to pass from the input to the output are therefore determined almost solely by the electromechanical coupling provided by the tuning fork 17. It has been explained how the vibration of the tines 27 is protected from shock vibration and other extraneous influences by the pliant section 23 serving to isolate the tuning fork tine structure from extraneous influences.

The undesirable effect of reed mode vibrations about compliant section 23 is removed in the electrical output circuit by cancellation coils 41 and 43 cooperating with the elongated common tine junction portion 27 of the tuning fork 17. Furthermore, sustained reed mode vibrations are conveniently damped by a dampening element 46 also cooperating with the elongated common tine junction portion 27.

From the foregoing explanation it will be seen that the structure of FIGURES 1 and 2 provides a very close approximation to perfect utilization of a tuning fork frequency selectivity characteristic in an electromechanical filter.

Figures 5, 6, 7, 7A, 8, 8A, 9, 10, 11, 12, 13, 14, 15:
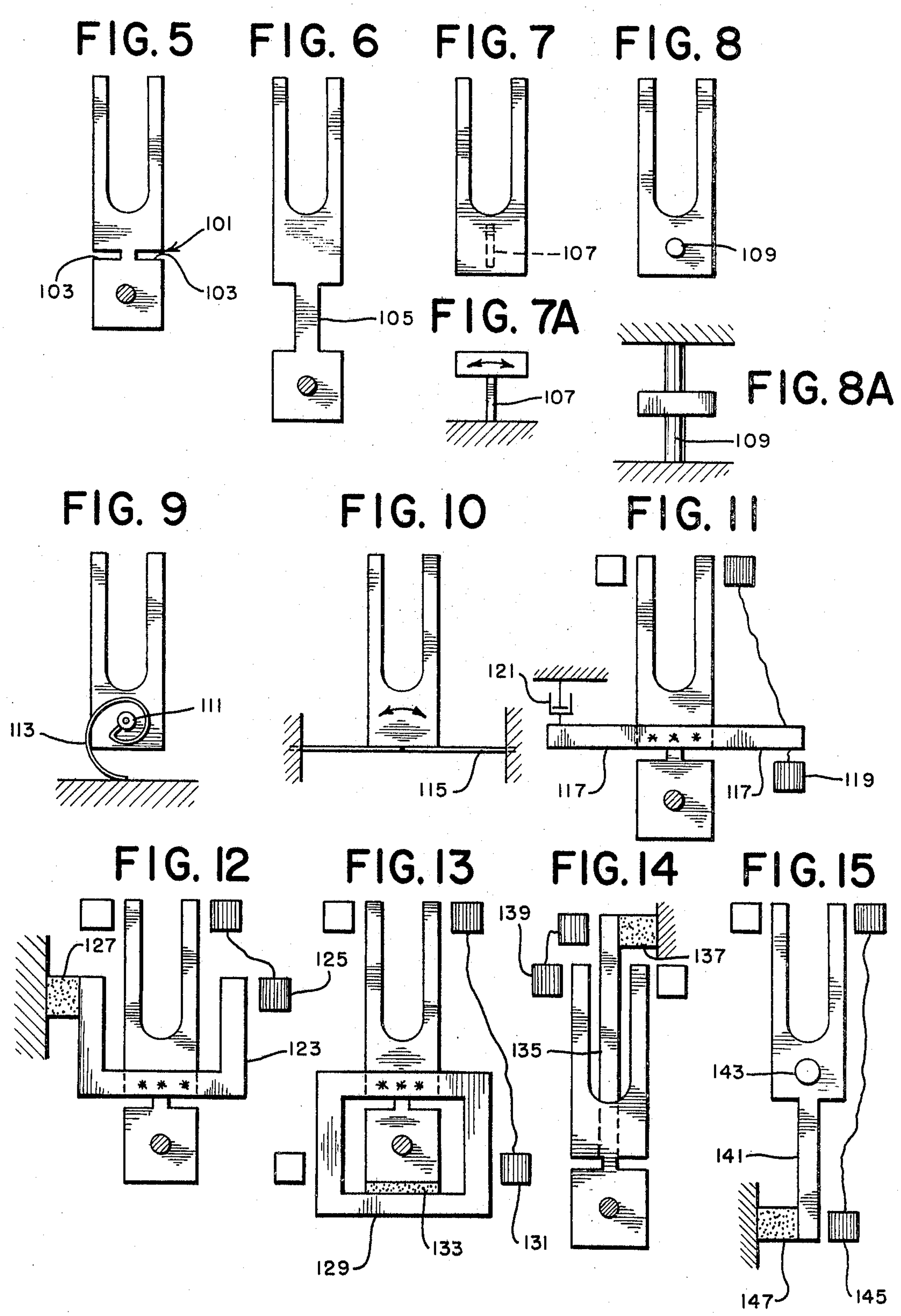

The underlying principles of the preesnt invention may be utilized in a wide variety of physical structures. FIGURES 5 through 10 of the drawings show various pliant sections or portions for tuning forks of which FIGURE 5 is the form selected for the structure of FIGURE 1. These pliant portions illustrated in FIGURES 6 through 10 will be referred to specifically later.

FIGURES 11 through 15 show alternative arrangements of tine junction portions which will also be discussed specifically.

Figure 3:
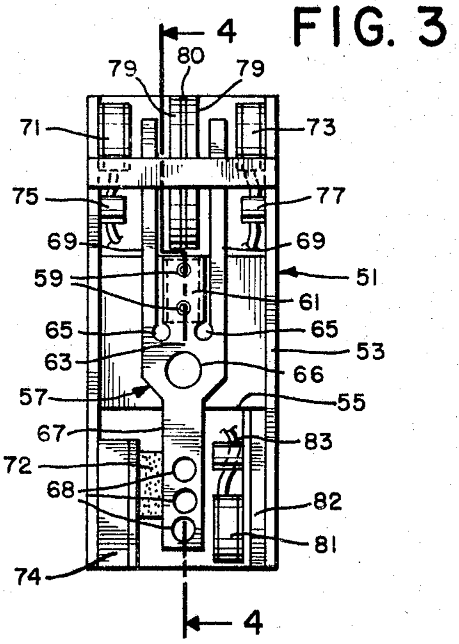
FIGURE 3 is a plan view of an alternative form of tuning fork resonator according to the present invention.
Figure 4:
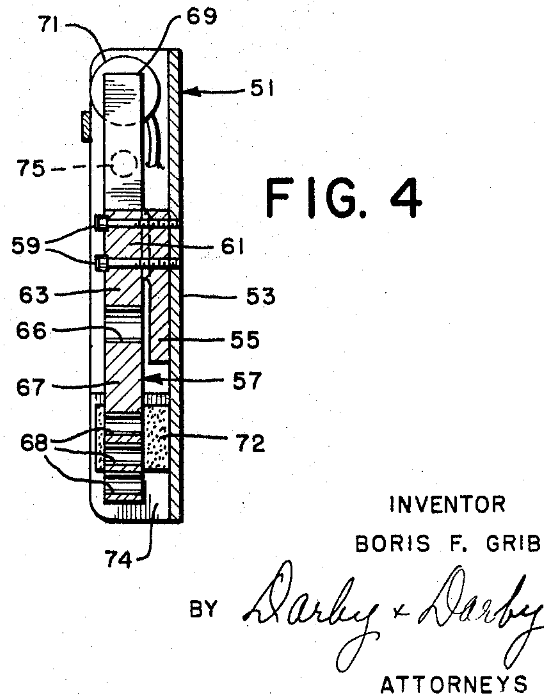
FIGURE 4 is a vertical sectional view of the resonator of FIGURE 3 taken along the line 4—4 in FIGURE 3.

FIGURE 15 shows a common tine junction arrangement of a form selected in an alternative embodiment illustrated in detail in FIGURES 3 and 4.

Referring to FIGURES 3 and 4, an electrically driven tuning fork resonator 51 is shown comprising a base 53 and a tuning fork 57. Tuning fork 57 is mounted on a platform 55 for proper positioning relative to the floor of base 53.

Tuning fork 57 is mounted to platform 55 and base 53 by appropriate means such as bolts 59.

Fork 57 includes a heel supporting portion 61, a pliant portion 63, a common tine junction portion 67 and a pair of tines 69.

In the structure of FIGURES 3 and 4, it will be noted that the extension of the common tine junction portion 67 in a direction opposite to the extension of tines 69 makes it convenient for the heel support portion 61 to be located between the fork tines 69. Such mounting arrangements are well known and do not affect the operation of the fork itself for purposes of the present explanation.

The constricted portion of the structure forming pliant section 63 may conveniently be provided by the appropriately dimensioned holes 65 provided by conventional machining operations.

As in the case of FIGURES 1 and 2, appropriate holes 66 and 68 may be provided to lighten the common tine junction portion of the tuning fork structure. Here in the case of FIGURES 3 and 4, it may be desirable to equalize the mass moment of inertia of the common tine junction portion relative to that of the fork tines.

Coils 71 and 73 and magnets 75 and 77 are provided substantially as described with reference to the apparatus of FIGURES 1 and 2. The magnetic shielding barriers 79 and the separator 80 are also provided as described in the apparatus of FIGURES 1 and 2.

A reed cancellation coil 81 is provided near the common tine junction portion most remote from the pliant section 63 similarly to the arrangement of FIGURES 1 and 2. In FIGURES 3 and 4 the second reed concellation coil has been omitted and replaced by a magnet 83. It will be noted that in the apparatus of FIGURES 3 and 4, the cancellation coil 81 is located substantially equally distant from the pliant section 63 as is the pickup coil 73. Thus, approximately equal changes in air gap will be expected at the respective coils and the respective coils may be approximately equally effective in converting displacements or changes in air gap to electrical signals.

A support 82 is provided to properly support coil 81 and magnet 83 at the proper spacing from the outward extension of common tine junction portion 67.

On the opposite side of the base from coil 81 a damping element 72 is provided which may also be supported by a support structure 74.

The basic principles of the invention apply to the apparatus illustrated in FIGURES 3 and 4 in generally the same way as described with respect to FIGURES 1 and 2. In some applications an advantage may be derived from the apparatus of FIGURES 3 and 4 due to the fact that the masses of the tines 69 and the common tine junction portion and extension 67 are oppositely disposed about the pliant section 63, thus diminishing the bending of pliant section 63 due to lateral shock or vibration. The arrangement of FIGURES 3 and 4 would be susceptible to angular accelerations but these are genrally less severe than lateral accelerations.

In some respects the apparatus of FIGURES 3 and 4 may present more complex interactions between vibrations of the tines 69 and the mass of the common tine junction portion 67. It should be noted that among the numerous variations of apparatus which may incorporate the principles of the invention each will have certain advantages which should be taken into account in selecting appropriate apparatus for a particular application or environment.

Referring to FIGURES 5 through 10, a variety of pliant sections for tuning forks are illustrated which may be incorporated in tuning fork resonator structure employing the principles of the present invention. FIGURE 5 illustrates a simple constriction form of pliant section 101 formed by a pair of slots 103 which is utilized in the apparatus of FIGURES 1 and 2 and in slightly modified form in the apparatus of FIGURES 3 and 4.

FIGURE 6 shows an elongated constriction 105 in which the bending of the pliant portion would be more distributed than in the case of the FIGURE 5 apparatus.

FIGURE 7 illustrates a fork with pliant section 107 extending at right angles to the plane of the tines and thus providing bending about a different axis.

FIGURE 8 and FIGURE 8A illustrate a torsion rod 109 forming pliant section for a tuning fork.

FIGURE 9 shows a tuning fork mounted for rotation about the center 111 of its common tine junction portion and with restoring force supply by a spiral spring 113.

FIGURE 10 illustrates a tuning fork structure including tines and a common tine junction portion mounted on a flexible beam 115 as a compliant section.

FIGURES 11 through 15 show various forms of common tine junction extensions with electrical coupling and the physical damping appropriate thereto.

FIGURE 11 illustrates a cross-type structure with lateral extensions 117 of the common tine junction portion and with appropriate electrical coupling 119 shown schematically and schematically-shown fluid damping device 121.

FIGURE 12 illustrates a U-shaped common tine junction portion extension and appropriate electrical coupling 125 and physical damping 127.

FIGURE 13 shows a common tine junction portion extension 129 extending oppositely from the fork tines and surrounding the fork heel support portion; electrical coupling 131 is illustrated schematically and a damping element is provided between the rear of the heel mounting portion and the common tine junction extension.

FIGURE 14 illustrates a common tine junction extension between and parallel to the fork tines with appropriate physical damping element and electrical coupling.

FIGURE 15 shows a common tine junction extension comprising a rigid bar extending oppositely from the fork tines with a torsion compliant section 143 as illustrated in FIGURES 8 and 8A. The apparatus is provided with a suitable electrical coupling element and a physical damping element 147.

While the theory of operation of apparatus according to the present invention has been explained in accordance with the best present understanding of such operation, the operability of the apparatus and its advantages are not predicated upon the theory of operation but are based upon actual operation and advantages of the actual apparatus. Accordingly, the invention is not to be construed to be limited by the theory of operation as it is presently understood nor is the operability of the apparatus to be construed to be dependent upon such theory.

What is claimed is:

1. In a tuning fork resonator comprising a tuning fork having a pair of tines, a common tine junction portion, a mounting heel portion secured to a base, and a pliant coupling section connecting said common tine junction portion with said mounting heel portion so that said common tine junction portion is vibratable in a reed mode about a predetermined reed-mode axis; the improvement comprising vibration damping means secured relative to said heel portion and base and coupled to said common tine junction portion to dissipate energy of vibration thereof.

2. In a tuning fork resonator comprising a tuning fork having a pair of tines, a common tine junction portion, a mounting heel portion secured to a base, and a pliant coupling section connecting said common tine junction portion with said mounting heel portion so that said common tine junction portion is vibratable in a reed mode about a predetermined reed-mode axis; the improvement comprising transducer means secured relative to said heel portion and base and electromagnetically coupled to said common tine junction portion to cancel electrical output of said tuning fork resonator due to reed-mode vibration of said tuning fork.

3. In a tuning fork resonator comprising a tuning fork having a pair of tines, a common tine junction portion, a mounting heel portion secured to a base, and a pliant coupling section connecting said common tine junction portion with said mounting heel portion so that said common tine junction portion is vibratable in a reed mode about a predetermined reed-mode axis; the improvement comprising vibration damping means secured relative to said heel portion and base and coupled to said common tine junction portion remotely from said pliant coupling section to dampen reed mode vibration of said fork.

4. A tuning fork resonator comprising a turning fork having a pair of tines, a common tine junction portion, a mounting heel portion secured to a base, a pliant coupling section connecting said common tine junction portion with said mounting heel portion so that said common tine junction portion is vibratable in a reed mode about a predetermined reed-mode axis, first means for driving one of said tines at its extremity, second means for sensing displacement of the other of said tines at its extremity and a third means for sensing displacement of said common tine junction portion.

5. Apparatus as claimed in claim 4, wherein said second and third means are coupled to said resonator output in opposition whereby the effect of the component of said other tine displacement due to reed mode vibration is essentially cancelled in said resonator output.

6. A tuning fork resonator comprising a tuning fork having a pair of tines, a common tine junction portion, a mounting heel portion secured to a base, a pliant coupling section connecting said common tine junction portion with said mounting heel portion so that said common tine junction portion is vibratable in a reed mode about a predetermined reed-mode axis, said common tine junction portion having an extension extending from said reed-mode axis a distance approximately equal to the length of said tines, and damping means secured relative to said heel portion and base and coupled to said common tine junction extension to dampen reed mode vibration of said tuning fork.

7. A tuning fork resonator comprising a tuning fork having a pair of tines, a common tine junction portion, a mounting heel portion secured to a base, and a pliant coupling section connecting said common tine junction portion with said mounting heel portion so that said common tine junction portion is vibratable in a reed mode about a predetermined reed-mode axis; an input to said resonator, a drive coil coupled to said input and arranged to drive one of said tines, a pickup coil arranged to produce a first signal responsive to displacement of the other of said tines, at least one reed signal cancellation coil arranged to produce a second signal responsive to displacement of said common tine junction portion, an output for said resonator and means for supplying said first and second signals in combination to said output with relative phase and magnitude such that any component due to reed-mode vibration of said fork is essentially cancelled.

8. Apparatus as claimed in claim 7, wherein said pickup coil and said reed signal cancellation coils are wound in a sense and with a number of turns such that direct magnetic coupling between said drive coil and each of the pickup coil and reed-cancellation coils is equally and oppositely represented in said output thereby substantially cancelling the effect of direct magnetic coupling.

References Cited

UNITED STATES PATENTS

| | | | |
|---|---|---|---|
| 2,838,698 | 6/1958 | Holt | 310—25 |
| 2,247,960 | 7/1941 | Michaels | 84—409 |
| 3,310,756 | 3/1967 | Dostal | 310—25 XR |
| 3,134,035 | 5/1964 | Grib | 310—25 |
| 2,806,400 | 9/1957 | Grib | 84—457 |

MILTON O. HIRSHFIELD, Primary Examiner

B. A. REYNOLDS, Assistant Examiner

U.S. Cl. X.R.

58—23; 84—409, 957; 318—128